United States Patent
Heath et al.

(10) Patent No.: US 8,552,749 B2
(45) Date of Patent: Oct. 8, 2013

(54) MEASURING CABLE RESISTANCE IN SYSTEM FOR PROVIDING POWER OVER COMMUNICATION CABLE

(75) Inventors: Jeffrey Lynn Heath, Santa Barbara, CA (US); John Arthur Stineman, Jr., Carpinteria, CA (US); Steve Robbins, Calabasas, CA (US)

(73) Assignee: Linear Technology Corporation, Milpitas, CA (US)

( * ) Notice: Subject to any disclaimer, the term of this patent is extended or adjusted under 35 U.S.C. 154(b) by 792 days.

(21) Appl. No.: 12/527,079

(22) PCT Filed: Oct. 23, 2007

(86) PCT No.: PCT/US2007/022430
§ 371 (c)(1),
(2), (4) Date: Jan. 13, 2010

(87) PCT Pub. No.: WO2008/100294
PCT Pub. Date: Aug. 21, 2008

(65) Prior Publication Data
US 2010/0141282 A1    Jun. 10, 2010

Related U.S. Application Data

(60) Provisional application No. 60/900,933, filed on Feb. 13, 2007.

(51) Int. Cl.
*G01R 27/08* (2006.01)
*H04B 1/16* (2006.01)

(52) U.S. Cl.
USPC ......... 324/691; 324/704; 324/713; 455/343.5

(58) Field of Classification Search
USPC ............... 324/691, 704, 713; 455/343.5
See application file for complete search history.

(56) References Cited

U.S. PATENT DOCUMENTS 6,597,183 B1 * 7/2003 Male .............................. 324/607
2006/0164108 A1 * 7/2006 Herbold ....................... 324/691

* cited by examiner

*Primary Examiner* — Melissa Koval
*Assistant Examiner* — Farhana Hoque
(74) *Attorney, Agent, or Firm* — McDermott Will & Emery LLP

(57) ABSTRACT

A system for providing power to a powered device over a communication cable has a cable resistance measuring mechanism that determines values of response signals detected in response to supplying each of at least three reference signals over the communication cable, and determines the resistance of a pair of wires in the cable based on these values. The cable resistance measuring mechanism may be configured for determining resistance of an Ethernet cable that delivers power to the powered device in a Power over Ethernet system.

23 Claims, 4 Drawing Sheets

BACKGROUND

MEASURING CABLE RESISTANCE IN SYSTEM FOR PROVIDING POWER OVER COMMUNICATION CABLE

This application is a U.S. National Phase under 35 U.S.C. 371 of International Application No. PCT/US2007/022430, filed on Oct. 23, 2007, which in turn claims priority of provisional U.S. patent application No. 60/900,933 filed on Feb. 13, 2007 and entitled "SYSTEMS AND METHODS FOR SUPPORTING POWER OVER ETHERNET SYSTEM", the disclosures of which Applications are incorporated by reference herein.

TECHNICAL FIELD

This disclosure relates to power supply systems, and more particularly, to circuitry and methodology for determining resistance of a communication cable in a system for providing power over the communication cable, such as a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a PoE system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. Based on the determined class of the PD, the PSE allocates the required power to the PD. However, certain amount of allocated power is not delivered to the PD due to a power loss over an Ethernet cable between the PSE and PD The IEEE 802.3af standard describes power distribution over the Ethernet by using the common mode voltage between 2 sets of twisted pairs within the CAT-5 cable. Current flows from the PSE to the PD on one twisted pair and return to the PSE on the other twisted pair. FIG. 1 illustrates a PoE system 10 described in the 802.3af standard. This system includes a PSE 12 that provides power to a PD 14 over the Ethernet cable having four twisted pairs of conductors—data pairs 16 and 18 and spare pairs 20 and 22. The data pairs 16 and 18 are respectively provided between data transformers 24 and 26 on the PSE side and data transformers 28 and 30 on the PD side. These data transformers may be used for connecting physical layer (PHY) devices involved in transmission (Tx) and reception (Rx) of data over the Ethernet.

The 802.3af standard indicates that the PSE 12 may be placed in 2 locations with respect to the Ethernet link segment. In particular, a PSE defined as an endpoint PSE may be arranged within data terminal equipment (DTE) or a repeater having a media dependent interface (MDI) that supports data transmission. Another type of a PSE defined as a midpoint PSE may be located within the link segment that is distinctly separate from the MDI and is between the MDIs.

The 802.3af standard indicates that Alternative A or Alternative B may be used for transferring power over the Ethernet. Alternative A involves transferring power over the data pairs 16 and 18, and usually is used for supplying power from endpoint PSEs. Alternative B provides transferring power over the spare pairs 20 and 22, and usually is used for supplying power from midpoints PSEs.

Propagation of power over a long Ethernet cable may result in substantial power loss. Currently, a PSE must allocate to a PD additional power to compensate for the maximum possible power loss over the Ethernet cable. However, it would be desirable to enable the PSE to determine how much power is being actually lost in the cable and to allocate additional power to compensate for the actual power loss, instead of the maximum possible power loss. To determine actual power loss, a cable resistance measuring mechanism is needed to measure the actual resistance of twisted pairs used for transferring power from the PSE to the PD. The PoE system treats a pair of wires connected to the same transformer winding as a single conductor. Therefore, to access power loss over the cable, the round trip DC resistance of a twisted pair should be determined.

A conventional cable resistance measuring scheme in a PoE system requires resistance measuring capabilities on both PSE and PD sides. For example, to support cable resistance measurements, a PD may include circuitry that provides short circuiting of the wires during the measurements. However, PDs may be any power consuming devices such as digital IP telephones, wireless network access points, PDA or notebook computer docking stations, cell phone chargers, HVAC thermostats, factory automation equipment, ID scanners, security systems, credit card terminals, and keyless entry systems. These devices do not have built-in capabilities for measuring resistance of the Ethernet cable that delivers power from the respective PSE. Therefore, it would be desirable to make cable resistance measurements without requiring cable resistance measurement capabilities on the PD side.

In addition, power interface circuitry provided between the PD and the Ethernet cable includes some elements, such as diode circuits, that have a considerable impact on cable resistance measurement results. Therefore, it would be desirable to develop a cable resistance measurement scheme that eliminates measurement errors caused by the power interface circuitry.

Moreover, to allow the PSE to dynamically allocate additional power based on the actual power loss over the cable, the cable resistance needs to be monitored while power is being delivered from the PSE to the PD over the cable. Therefore, it would be desirable to develop a cable resistance measuring scheme that does not interfere with the power delivery.

SUMMARY OF THE DISCLOSURE

The present disclosure offers a system for providing power to a powered device (PD) over a communication cable. The system comprises a cable resistance measuring mechanism configured for determining values of response signals detected in response to supplying each of at least three reference signals over the communication cable, and for determining resistance of a pair of wires in the cable based on these values.

For example, the cable resistance measuring mechanism may be configured for determining resistance of an Ethernet cable that delivers power to the powered device in a Power over Ethernet (PoE) system.

In accordance with one aspect of the disclosure, the cable resistance may be determined without measurement capabilities at the PD side of the cable, i.e. without measurement operations performed on the PD side.

In accordance with another aspect of the disclosure, the values of the response signals may be determined while the power is being supplied to the powered device over the communication cable.

In accordance with an embodiment of the disclosure, the resistance measuring mechanism comprises a reference source for producing the reference signals at various levels, and a response signal detector, such as an analog-to-digital converter (ADC), for determining the response signals.

For example, the current source may produce first, second and third reference current levels, and the ADC may determine first, second and third voltage values developed in response to supplying the respective reference current levels.

The first, second and third reference current levels may be substantially less than a load current level. The second reference current level may correspond to a function of first and third reference current levels. For example, it may correspond to the square root of the product of the first and second reference current levels.

In accordance with an embodiment of the disclosure, the communication cable may include first and second power pairs of wires configured for supplying power to the powered device, and at least one spare pair of wires, which is not used for transferring power.

The cable resistance measuring mechanism may be configured for determining the cable resistance using the spare pair when power is supplied to the powered device over the power pairs.

First and second diode elements may be provided at the PD side of the communication cable and coupled to the first and second power pairs, respectively. As these elements have a substantial impact on cable resistance measurement results, the cable resistance measuring mechanism of the present disclosure employs a resistance measuring scheme that eliminates this impact and provides accurate measurement results.

In accordance with a method of the present disclosure, the following steps may be carried out for determining resistance of a communications cable in a system for supplying power to a powered device over the communications cable, determining values of response signals detected in response to supplying a number of reference signals over the communication cable, and determining resistance of the cable based on the determined values of the response signals, wherein the number of the reference signals may be selected to account for modifications of the response signals caused by circuit elements on the PD side of the cable.

In accordance with another aspect of the disclosure, a local area network may comprise:
  at least a pair of network nodes,
  a network hub, and
  a communication cable for connecting the network nodes to the network hub to provide data communications.

The communication cable has power pairs of wires and a spare pair of wires. The network hub has a power supply device for providing power to a load over the power pairs of wires. The network includes a cable resistance measurement mechanism comprising:
  a reference signal source configured for injecting a number of reference signals onto the spare pair, the reference signals differ with respect to each other, and
  a response signal detector configured for detecting a response at the spare pair to each of the reference signals to determine resistance of the cable.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a mechanism for measuring resistance of an Ethernet cable in a PoE system. It will become apparent, however, that the concepts described herein are applicable to any scheme for measuring resistance of a communication link in a system capable of providing power over the communication link.

For example, the cable resistance measuring mechanism of the present disclosure may be provided in a local area network (LAN) having a plurality of nodes, a network hub and a communication cable connecting the nodes to the network hub for providing data communications. The network hub may include a power supply device for providing power to a powered device over the communication cable.

Figure 1:
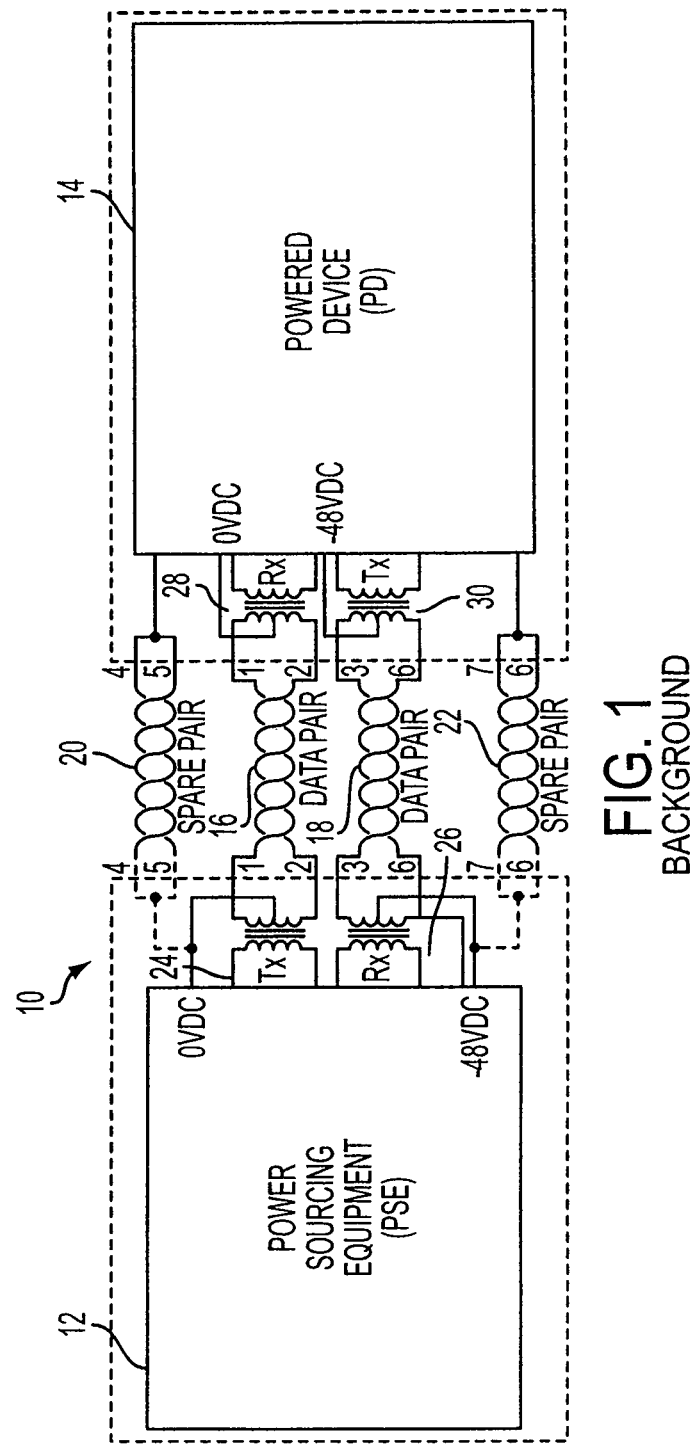
FIG. 1 is a diagram illustrating topology of a regular PoE system.
Figure 2:
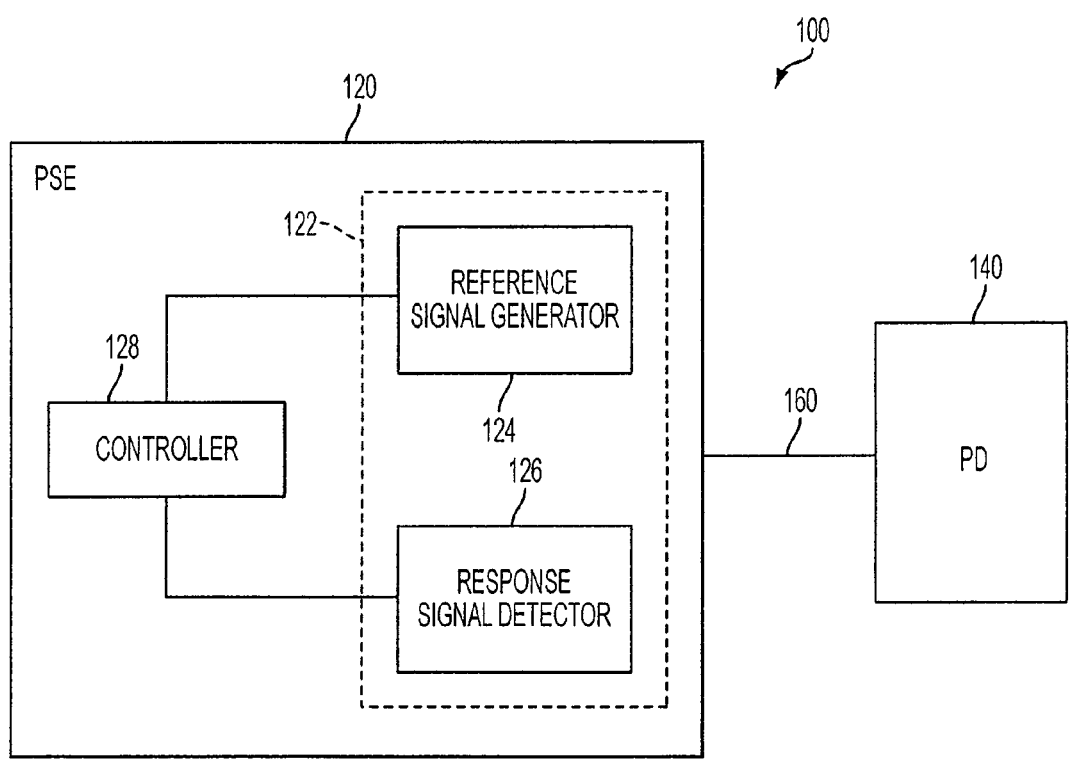
FIG. 2 illustrates a PoE system having a cable resistance measuring mechanism of the present disclosure.

Referring to FIG. 2, a PoE system 100 of the present disclosure comprises a PSE 120 configured for supplying power to a PD 140 over an Ethernet cable 160. For example, the PSE 120 may interact with the PD 140 in accordance with the IEEE 802.3af standard. In particular, the PSE 120 and the PD 140 participate in the PD detection procedure, during which the PSE 120 probes a link to detect the PD. If the PD is detected, the PSE 120 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE allocates power demanded by the PD 140 and applies the power to the PD 140 if the requested amount of power is available. The power may be applied over two of four twisted pairs of the Ethernet cable 160 that connects the PSE 120 to the PD 140. If the available power is not sufficient to supply the PD, the request for power may be denied.

Due to the power loss over the Ethernet cable 160, the PSE 120 must allocate to the PD 140 the additional amount of power to compensate for the power loss. A conventional PSE determines the additional amount of power based on the maximum possible power loss over the Ethernet cable. However, the actual power loss may be less than the maximum possible amount. As a result, the PSE may allocate to some PDs more power than the PDs need. At the same time, requests for power from other PDs may be denied. Therefore, it would be desirable to allocate power based on the actual power loss over the cable that connects the PSE to a particular PD rather than based on the maximum possible power loss.

As the actual power loss depends on the resistance of the Ethernet cable, there is a need for a mechanism capable of determining the cable resistance. The PSE 120 of the present disclosure contains a cable resistance measuring mechanism 122 configured for determining resistance of the Ethernet cable 160. As described in more detail below, the cable resistance measuring mechanism 122 of the present disclosure may be configured for measuring resistance of the cable 160 while power is being supplied over the cable 160 from the PSE 120 to the PD 140, i.e. the cable resistance measuring procedure does not interfere with the power supply procedure. Hence, the cable resistance measuring mechanism 122 may support the dynamic power allocation system that modifies the power allocated to a particular PD based on the actual power lost over the communication link used for providing power to that PD.

Also, the cable resistance measuring mechanism 122 may be configured to enable the PSE 120 to determine the resistance of the cable 160 without requiring cable resistance measurement capabilities on the PD side. Hence, the cable resistance measuring mechanism 122 may operate with any type of PD.

Moreover, PD power interface circuitry provided to support power supply of the PD 140 over the Ethernet cable 160 may include some elements, such as diode circuits, that have a considerable impact on cable resistance measurement results. The cable resistance measuring mechanism 122 of the present disclosure employs a resistance measuring scheme that eliminates this impact and provides accurate measurement results.

The resistance measuring mechanism 122 includes a reference signal generator 124 and a response signal detector 126. For example, the reference signal generator 124 may be configured to generate various levels of reference current $I_{REF}$ supplied over the Ethernet cable 160. The response signal detector 126 may be configured to detect voltage values developed at the cable 160 in response to the various levels of the reference current $I_{REF}$. Alternatively, the reference signal generator 124 may produce various levels of reference voltage, and the response signal detector 126 may detect current drawn over the cable 160 in response to the various levels of the reference voltage. A PSE controller 128 may control the cable resistance measuring operations and determine the cable resistance based on the detected response signals.

Figure 3:
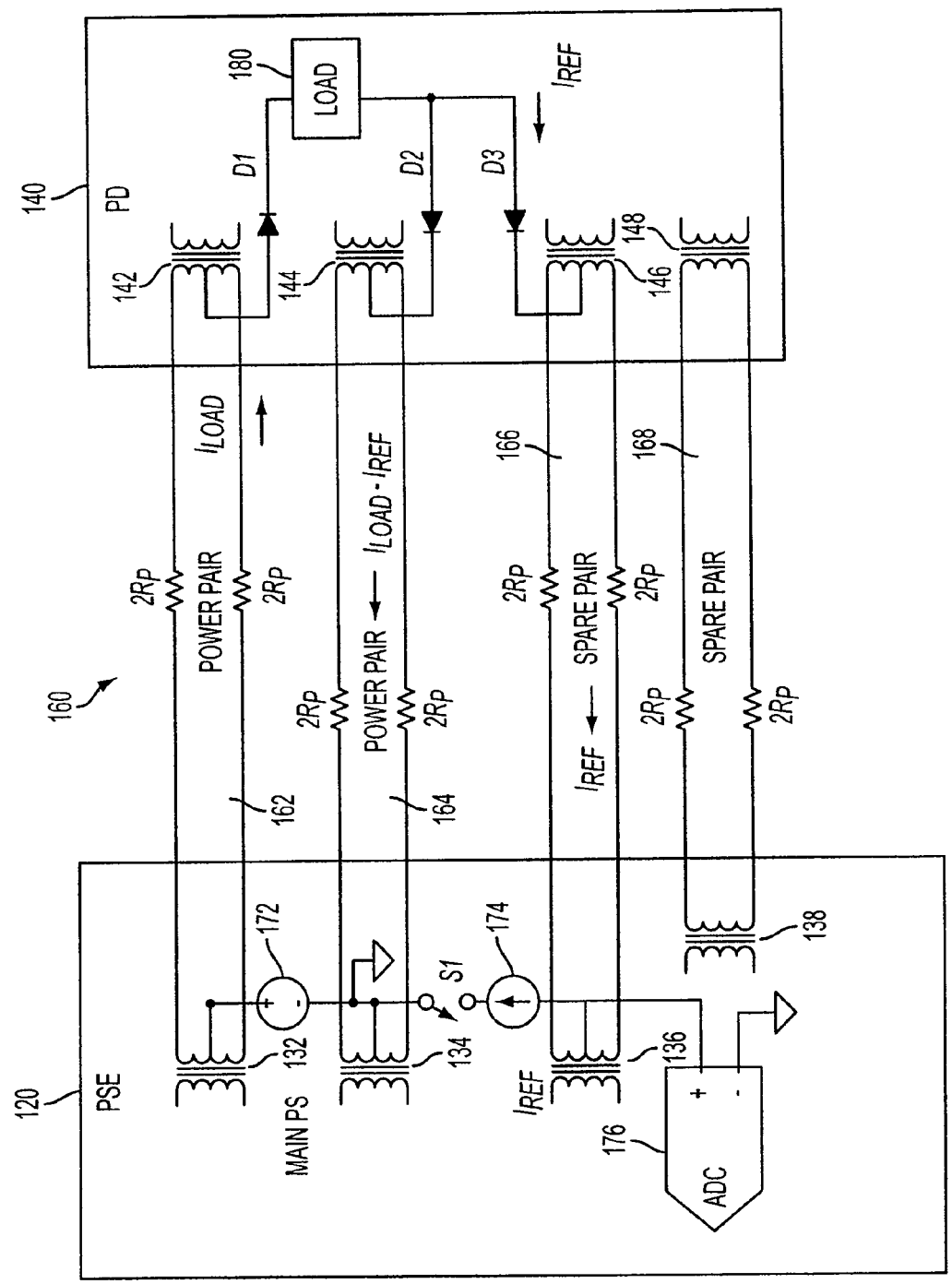
FIG. 3 illustrates an exemplary embodiment of the cable resistance measuring mechanism of the present disclosure.

FIG. 3 illustrates an exemplary embodiment of the cable resistance measuring mechanism 122 of the present disclosure. The Ethernet cable 160 may have 4 pairs of twisted wires 160, 162, 166 and 168. The twisted pairs 162 and 164 employed for delivering power from the PSE 120 to the PD 140 are identified as power pairs. Spare twisted pairs 166 and 168 are not used for power supply. Transformers 132, 134, 136 and 138 connects the respective twisted pairs 162, 164, 166 and 168 to the PSE 120, whereas transformers 142, 144, 146 and 148 connects the respective twisted pairs 162, 164, 166 and 168 to the PD 140.

The cable resistance measuring mechanism 122 treats each pair of wires connected to the same transformer winding as a conductor having DC resistance $R_P$. The measuring mechanism 122 assumes that the round-trip DC resistances $R_P$ of all twisted pairs are equal. Each wire connected in parallel to the other wire of the respective pair is shown in FIG. 3 as having resistance $2R_P$.

The PSE 120 may comprise a main power supply (PS) 172 that provides power to the PD 140 over the power twisted pairs 162 and 164. The cable resistance measuring mechanism 122 provided on the PD side may comprise a reference current source 174 connected to the winding of the transformer 136 for injecting onto the spare twisted pair 166 various predetermined levels of reference current $I_{REF}$. Switch S1 may be arranged for connecting the reference current source 174 to the winding of the transformer 134. Further, the cable resistance mechanism 122 may include an analog-to-digital converter (ADC) 176 having a non-inverting input connected to the spare twisted pair 166 for sensing a voltage level $V_0$ in response to injecting the reference current $I_{REF}$. The inverting input of the ADC 176 is grounded.

On the PD side, a load 180 is connected to the power twisted pairs 162 and 164 via diodes D1 and D2 provided to interface the load 180 to the power supply. The load 180 is connected to the spare twisted pair 166 via a diode D3.

The challenge in measuring a voltage value developed in response to injecting the reference current is to account for the voltage drops on the diodes D1 and D2 that have a substantial impact on the accuracy of the measurement results. In particular, the voltage $V_0$ sensed in response to injecting the reference current $I_{REF}$ into the spare pair 166 is equal to:

$$V_0 = I_{REF}R_P + V_{D2} - (I_{LOAD} - I_{REF})R_P - V_{D1},$$

where $V_{D1}$ and $V_{D2}$ are values of a voltage drop on the diodes D1 and D2, respectively, and $I_{LOAD}$ is a value of the load current drawn by the load 180 supplied from the main power supply 172. As shown in FIG. 3, when the reference current $I_{REF}$ is injected onto the spare pair 166, the load current $I_{LOAD}$ flows over the power pair 162, and the current value $I_{LOAD} - I_{REF}$ is developed in the power pair 164.

Figure 4:
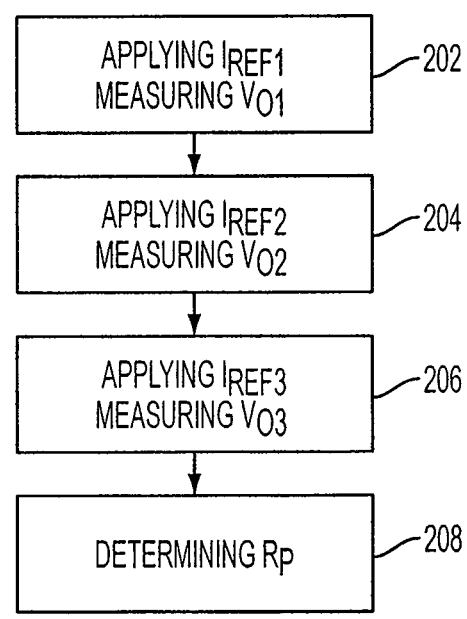
FIG. 4 illustrates operations performed by the cable resistance measuring mechanism of the present disclosure.

To account for the voltage drops on the diodes D1 and D2, a cable resistance measuring scheme of the present disclosure involves determining voltage $V_0$ developed in response to injecting at least three predetermined levels of the reference current $I_{REF}$. As illustrated in FIG. 4, the cable resistance measuring procedure begins with injecting into the spare pair 166 a first level $I_{REF1}$ of the reference current produced by the reference current source 174. The ADC 176 determines voltage value $V_{O1}$ developed in response to applying the $I_{REF1}$ current (block 202).

Then, the reference current source 174 produces a second level $I_{REF2}$ of the reference current applied to the spare pair 166. The ADC 176 determines voltage value $V_{O2}$ produced in response to the $I_{REF2}$ current (block 204). Finally, the reference current source 174 produces a third level $I_{REF3}$ of the reference current applied to the spare pair 166. The ADC 176 determines voltage value $V_{O3}$ produced in response to the $I_{REF3}$ current (block 206).

The current levels $I_{REF1}$, $I_{REF2}$, and $I_{REF3}$ differ with respect to each other. In particular, $I_{REF2} = \sqrt{I_{REF1} \times I_{REF3}}$. The current levels $I_{REF1}$, $I_{REF2}$, and $I_{REF3}$ are selected to be substantially smaller than the load current $I_{LOAD}$. It is assumed that when the values $V_{O1}$, $V_{O2}$ and $V_{O3}$ are determined, the $I_{LOAD}$ level is constant. The current levels $I_{REF1}$, $I_{REF2}$, and $I_{REF3}$ may be set by the PSE controller 128 controlling the reference current source 174.

Based on the determined values $V_{O1}$, $V_{O2}$ and $V_{O3}$, the round-trip DC resistance $R_P$ of a twisted pair in the cable 160 may be calculated in block 208 as follows:

$$R_P \approx \frac{2V_{O2} - V_{O1} - V_{O3}}{2I_{REF1} + 2I_{REF3} - 4I_{REF2}}.$$

The $R_P$ value may be determined by the PSE controller 128 receiving digital values $V_{O1}$, $V_{O2}$ and $V_{O3}$ from the ADC 176.

As the spare pair 166 is used for injecting reference current $I_{REF}$ and sensing the resulting voltage values $V_{O1}$, $V_{O2}$ and $V_{O3}$, the cable resistance measuring procedure does not interfere with the power supply provided over the power pairs 162 and 164. Therefore, the resistance of a cable may be determined while power is being supplied over the cable.

Moreover, the resistance of the cable 160 is determined without any measurement operations performed on the PD side. Hence, the cable resistance measuring procedure of the present disclosure does not require measuring capabilities on the PD side. Therefore, cable resistance measuring mechanism of the present disclosure may support any type of PD connected to the cable 160.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power to a powered device over a communication cable, the system comprising a cable resistance measuring mechanism configured for:
   determining a value of a first response signal detected in response to a first reference signal supplied over the communication cable,
   determining a value of a second response signal detected in response to a second reference signal supplied over the communication cable,
   determining a value of a third response signal detected in response to a third reference signal supplied over the communication cable, where the first, second and third reference signals differ with respect to each other, and
   determining resistance of a pair of wires in the cable based on values of the first second and third response signals and values of the first, second and third reference signals,
   the resistance being determined without measurement operations performed on a powered device side of the communication cable.

2. The system of claim 1, wherein the cable resistance measuring mechanism is configured for determining resistance of an Ethernet cable for delivering power to the powered device in a Power over Ethernet system.

3. The system of claim 1, wherein the values of the first, second and third response signals are determined while the power is being supplied to the powered device over the communication cable.

4. The system of claim 1, wherein the cable resistance measuring mechanism is configured for determining the resistance without measurement operations performed on a powered device side of the communication cable.

5. The system of claim 1, wherein the resistance measuring mechanism comprises an analog-to-digital converter for determining the first, second and third response signals.

6. The system of claim 5, wherein the resistance measuring mechanism further comprises a reference source for producing the first, second and third reference signals.

7. The system of claim 1, wherein the first, second and third reference signals respectively represent first, second and third reference current levels produced at a power supply device.

8. The system of claim 7, wherein the first, second and third response signals respectively represent first, second and third voltage values detected at the power supply device.

9. The system of claim 7, wherein the first, second and third reference current levels are less than a load current level.

10. The system of claim 7, wherein the second reference current level corresponds to a function of first and third reference current levels.

11. The system of claim 10, wherein the second reference current level corresponds to the square root of the product of the first and third reference current levels.

12. The system of claim 1, wherein the communication cable includes first and second power pairs of wires configured for supplying power to the powered device, and at least one spare pair of wires.

13. The system of claim 12, wherein the cable resistance measuring mechanism is configured for determining the resistance using the spare pair when power is supplied to the powered device over the power pairs.

14. The system of claim 12, wherein the first, second and third reference signals are supplied over the spare pair.

15. The system of claim 14, wherein the first, second and third response signals are detected at the spare pair.

16. The system of claim 12, further comprising first and second diode elements provided at a powered device side of the communication cable and coupled to the first and second power pairs, respectively.

17. A method of determining resistance of a communications cable in a system for supplying power to a powered device over the communications cable, the method comprising the steps of:
- determining values of response signals detected in response to supplying a number of reference signals over the communication cable, and
- determining resistance of the cable based on the determined values of the response signals,
- wherein the number of the reference signals is selected to account for changes in the response signals caused by circuit elements on a powered device side of the cable, and
- the resistance is determined without measurement operations performed on the powered device side of the communication cable.

18. The method of claim 17, wherein the values of the response signals are determined while the power is being supplied to the powered device over the communications cable.

19. A Power over Ethernet system for delivering power from a power sourcing equipment (PSE) to a powered device (PD) over a cable having first and second pairs of wires configured for supplying the power to the powered device, and at least one spare pair of wires, the system comprising:
- a power supply configured for supplying the power over the first and second pairs,
- a reference signal source configured for injecting at least three reference signals onto the spare pair, the reference signals differ with respect to each other, and
- a response signal detector configured for detecting a response to each of the three reference signals to determine resistance of the cable,
- the resistance being determined without measurement operations performed on a powered device side of the communication cable.

20. The system of claim 19, wherein the response signal detector is configured for detecting the response at the spare pair while the power is being supplied from the power supply over the first and second pairs.

21. A local area network comprising:
- at least a pair of network nodes,
- a network hub, and
- a communication cable for connecting the network nodes to the network hub to provide data communications, the communication cable having power pairs of wires and a spare pair of wires,
- the network hub having a power supply device for providing power to a load over the power pairs of wires, the network including a measurement mechanism for determining resistance of the cable, the measurement mechanism comprising:
- a reference signal source configured for injecting a number of reference signals onto the spare pair, the reference signals differ with respect to each other, and
- a response signal detector configured for detecting a response at the spare pair to each of the reference signals to determine resistance of the cable,
- the resistance being determined without measurement operations performed on a load side of the communication cable.

22. The network of claim 21, wherein the measurement mechanism is configured for determining the resistance of the cable without measuring operations performed on a load side of the cable.

23. The network of claim 21, wherein the measurement mechanism is configured for determining the resistance of the cable while the power is being supplied from the power supply device to the load over the communication cable.

* * * * *